United States Patent [19]

Roters, deceased et al.

[11] 3,891,874

[45] June 24, 1975

[54] COMPENSATED RECIPROCATING ELECTRODYNAMIC MACHINE

[75] Inventors: Herbert C. Roters, deceased, late of Nogales, Ariz. by Mary D. Roters, executrix, Nogales, Ariz.

[73] Assignee: Mechanical Technology Incorporated, Latham, N.Y.

[22] Filed: May 31, 1973

[21] Appl. No.: 365,584

[52] U.S. Cl. .................. 310/14; 310/15; 310/27; 310/34; 318/123; 318/129
[51] Int. Cl. ............................................. H02k 33/00
[58] Field of Search ............ 310/12, 13, 14, 15, 24, 310/27, 30, 33, 34, 35; 318/122, 123, 129, 119; 30/45

[56] References Cited
UNITED STATES PATENTS

| | | | |
|---|---|---|---|
| 3,024,374 | 3/1962 | Stauder | 310/14 X |
| 3,119,940 | 1/1964 | Pettit et al. | 310/15 |
| 3,149,255 | 9/1964 | Trench | 310/30 |
| 3,336,488 | 8/1967 | Scott | 310/30 X |
| 3,441,819 | 4/1969 | Palmero | 310/15 X |
| 3,484,629 | 12/1969 | Kunz | 310/15 |
| 3,723,779 | 3/1973 | Gillum | 310/27 X |
| 3,777,236 | 12/1973 | Hrubes et al. | 310/27 |

*Primary Examiner*—Gerald Goldberg
*Attorney, Agent, or Firm*—Joseph V. Claeys; Charles W. Helzer

[57] ABSTRACT

A reciprocating electrodynamic machine comprises a magnetic circuit in which a substantially constant flux is maintained; A-C energizable windings carried by axially spaced apart stator poles having slots with overhung tooth tips which simultaneously confront the axially spaced apart poles of an axially movable armature across a small air gap, and short-circuited compensating windings on the armature poles. Alternating currents induced in the short-circuited compensating windings substantially cancel the alternating components of flux in the armature poles.

26 Claims, 3 Drawing Figures

COMPENSATED RECIPROCATING ELECTRODYNAMIC MACHINE

This invention relates to linear reciprocating electrodynamic machines, that is, to reciprocating electrodynamic machines having axially reciprocating armatures and more particularly to such machines of the type having toothed stators with windings, and moving armatures.

Although the invention relates to linear reciprocating electrodynamic machines generally, including both motors and generators, it will be particularly described herein in connection with linear electrical motors. Motors of this type often operate with poles magnetized alternately to produce an axial force which is utilized to set a suitable spring-mass system into oscillation. Since neither the means for supporting the armature for movement nor the spring-mass system are part of this invention per se, they will not be illustrated or described herein.

Wound stator, axially reciprocating armature type motors have long been known as shown, for example, by U.S. Pat. No. 431,495, Van Depoele, issued July 1, 1890. Various forms of such motors are also shown, for example, in the following U.S. Pat. Nos.:

3,024,374 Stauder issued Mar. 6, 1962; 3,119,940 Pettit issued Jan. 28, 1964; 3,149,255 Trench issued Sept. 15, 1964; 3,336,488 Scott issued Aug. 15, 1967.

While the linear reciprocating electrodynamic machines of this invention may incorporate some of the same basic electrodynamic principles utilized in the foregoing and other prior art patents, the present invention departs from the teachings of the prior art in a significant manner and provides a linear reciprocating electrodynamic machine which is distinct and different in structure, operation and advantages to be gained from the prior art type machines.

It is an object of this invention to provide a new and improved linear reciprocating electrodynamic machine which overcomes one or more of the problems of the prior art type machines and which is both easier and less expensive to manufacture and easier to incorporate and be combined with the devices by which it is adapted to be driven, or to drive.

It is another object of the invention to provide a new and improved linear reciprocating electrodynamic machine which exhibits significantly improved operating characteristics including a higher power factor over known prior art type machines.

It is a further object of the invention to provide a new and improved linear reciprocating electrodynamic machine which is easier to mount and to match with its driving or driven devices and components and which lends itself to a smaller and more compact configuration.

It is still another object of the invention to provide a new and improved linear reciprocating electrodynamic machine having an electromagnetic structure which reduces alternating flux to a minimum thereby reducing machine losses and improving power factor.

Briefly stated, in accordance with one aspect of this invention, a new and improved linear reciprocating electrodynamic machine comprises a magnetic circuit including a constant flux source, a stator member having axially spaced stator poles with slots and tooth tips and carrying differentially connected A.C. excited windings, and an armature member mounted for axial movement within the stator member and including axially spaced poles which simultaneously confront the stator pole teeth across an air gap. Each of the armature poles is provided with low resistance current paths, such as short-circuited coils, which are operative to cancel alternating flux in the armature poles.

The novel features believed characteristic of the invention are set forth with particularity in the appended claims. The invention itself, however, and its method of operation together with further objects and advantages thereof may best be understood by reference to the following description taken in conjunction with the accompanying drawings, wherein like reference numerals designate the same or similar parts and in which:

FIG. 1 is a diagrammatic sectional view of the electromagnetic structure of a linear reciprocating electrodynamic machine in accordance with one embodiment of the invention;

FIG. 2 is a diagrammatic sectional view of a linear reciprocating electrodynamic machine in accordance with another embodiment of the invention wherein the constant flux of the magnetic circuit is produced by a permanent magnet means carried by the stator; and FIG. 3 is a diagrammatic sectional view of the electromagnetic structure of a linear reciprocating electrodynamic machine in accordance with still another embodiment of the invention wherein the constant flux is produced by a permanent magnet means carried by the armature.

GENERAL DESCRIPTION

A new and improved linear reciprocating electrodynamic machine is provided which comprises a stator member having axially spaced-apart poles, and an armature disposed within the stator member for reciprocating movement and having similarly spaced-apart poles. The stator and armature poles are arranged to provide a magnetic circuit having a constant amount of flux induced by a direct current excited coil (FIG. 1) or by a permanent magnet means (FIGS. 2 and 3) so arranged that the flux crosses an air gap from one stator pole to an opposite pole at one end of the movable armature and returns across an air gap at the other end of the armature through an opposite stator pole.

The center of each stator pole is provided with a slot with overhung tooth tips and there are stator coils carrying opposite alternating currents in the two slots which shift the constant flux from one side of each pole (half-pole) to the other so that the flux in each stator half-pole is pulsating. Preferably, to assure that the air gap flux density and the direct current ampere turns are the same throughout the alternating current cycle as the armature moves back and forth within the stator member, the total air gap area of each armature pole is made the same as the area of the facing stator pole tooth tip.

So far as known, in all toothed stator prior art linear reciprocating electrodynamic machines, the alternating current in the stator creates an MMF across the slot openings which causes a large leakage flux down one side of each armature pole and up the other side thus creating large eddy current losses in the armature and inducing reactive voltages in the alternating current circuit which cause low power factor.

In accordance with this invention, this unwanted alternating flux is cancelled by the induced alternating currents in low resistance current paths provided in each armature pole. These low resistance current paths are conveniently provided by short-circuited coils which operate to prevent any alternating flux from going through them, except for that needed to supply the IR drops in the coils. For example, since the coils are short-circuited the induced current which flows in them will set up a field in such a direction as to oppose the mmf which caused it. Thus, the alternating current in the stator slot creates an MMF across the slot opening, which generates an axial force, and causes the steady flux to shift from one side of the stator pole to the other but does not create any appreciable alternating flux across the air gap. Accordingly, the eddy current losses are lower and the power factor higher than in other linear reciprocating electrodynamic machines heretofore known.

DETAILED DESCRIPTION

Figure 1:
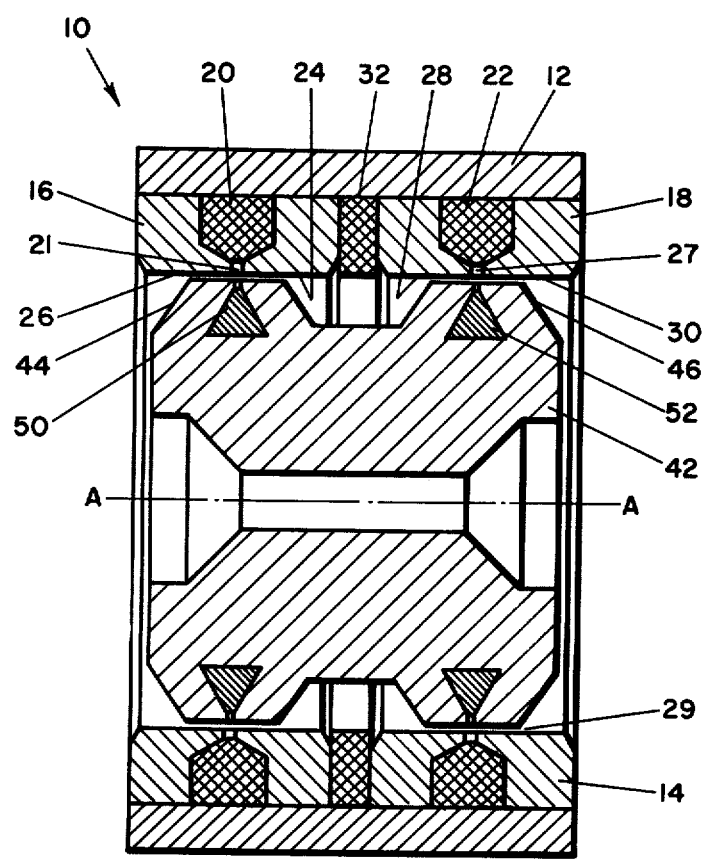

Referring now to the drawing, FIG. 1 illustrates the electromagnetic structure of a linear motor in accordance with one embodiment of the invention. As shown motor 10 comprises a magnetic housing or frame 12 within which there is disposed a stator core 14. Stator core 14 includes axially spaced-apart poles 16 and 18 carrying respective wound coils 20 and 22. Each of the poles 16 and 18 is provided at the center with a slot with overhung tooth tips. As shown, pole 16 is provided with a slot 21 and overhung tooth tips 24 and 26, and pole 18 is provided with a slot 27 and overhung tooth tips 28 and 30. Overhung tooth tips 24, 26, 28 and 30 each have equal air gap areas. Stator core 14 also includes a wound coil 32 disposed between the poles 16 and 18. Coil 32 is arranged to be energized, as by a suitable source of direct current or rectified alternating current, to produce a constant magnetic flux in the magnetic circuit. Stator core 14 may be formed of laminations of suitable magnetic material in well known manner.

Coils 20 and 22 are disposed on the respective stator poles 16 and 18 and are arranged to be energized, as from a suitable source of alternating current, so as to carry opposite alternating currents in the two slots 21 and 27 which operate to shift the constant flux from one side of the pole to the other. Conveniently, stator pole coils 20 and 22 may be connected together in series bucking relationship.

The motor 10 also includes an armature 42 arranged to be supported for movement along the axis A—A of stator core 14. Armature 42, which may be constructed of a suitable magnetic material, such as soft iron, includes a body portion with poles 44 and 46 at the respective ends thereof. Preferably, the center lines of the poles are spaced apart a distance equal to the distance between the center lines of the stator poles 16 and 18. The armature poles 44 and 46 extend toward the stator pole tooth tips and are spaced slightly therefrom to define the air gap 29. Because of the foregoing described spacing of the stator and armature poles, the armature poles 44 and 46 simultaneously confront respective tooth tips of the stator poles 16 and 18. Also, to assure that the air gap flux density and direct current ampere turns of the magnetic circuit remain constant regardless of the position of armature 42 in stator core 14, the total air gap area of each armature pole is made the same as the area of its facing stator tooth tip. For example, the air gap area of armature pole 44 is made the same as the air gap area of tooth tip 24 (which is the same as the air gap area of tooth tip 26). Similarly, the air gap area of armature pole 46 is made the same as the air gap area of tooth tip 28 (which is the same as the air gap area of tooth tip 30).

Also, in accordance with this invention and for purposes to be described in more detail later, armature pole 44 carries a short-circuited coil 50 and armature pole 46 carries a similar short-circuited coil 52.

The foregoing arrangement of armature poles 44 and 46 and tooth tips 24–26 and 28–30 of the respective spaced stator poles 16 and 18 is such that there is provided a magnetic circuit which reduces leakage flux to a minimum, requires only one clearance gap between the stator and the moving armature, and with the air gap flux density and direct current ampere turns remaining constant regardless of the position of the armature. Also, both armature poles 44 and 46 are operative since they simultaneously confront tooth tips of the spaced stator poles 16 and 18.

The foregoing arrangement thus provides for utilization of the total axial length of the armature poles at all times during operation as well as providing that flux transfer takes place entirely within the stator and flux in the armature remains constant. Since there is no change in flux in the armature during operation, the hysteresis and eddy current losses are much lower than prior art arrangements wherein flux transfer is effected by a change in flux in both the armature and the stator.

Preferably, to keep end leakage flux to a minimum, the machine is of cylindrical construction with the armature 42 disposed within, and movable axially in the stator core 14. In such a construction the poles 16 and 18 are circular as are the windings carried by such poles. Further, the armature 42 may then be conveniently formed of a plurality of solid iron circular members with the short-circuited coils of the armature poles in the form of discs of copper or the like.

Figure 2:
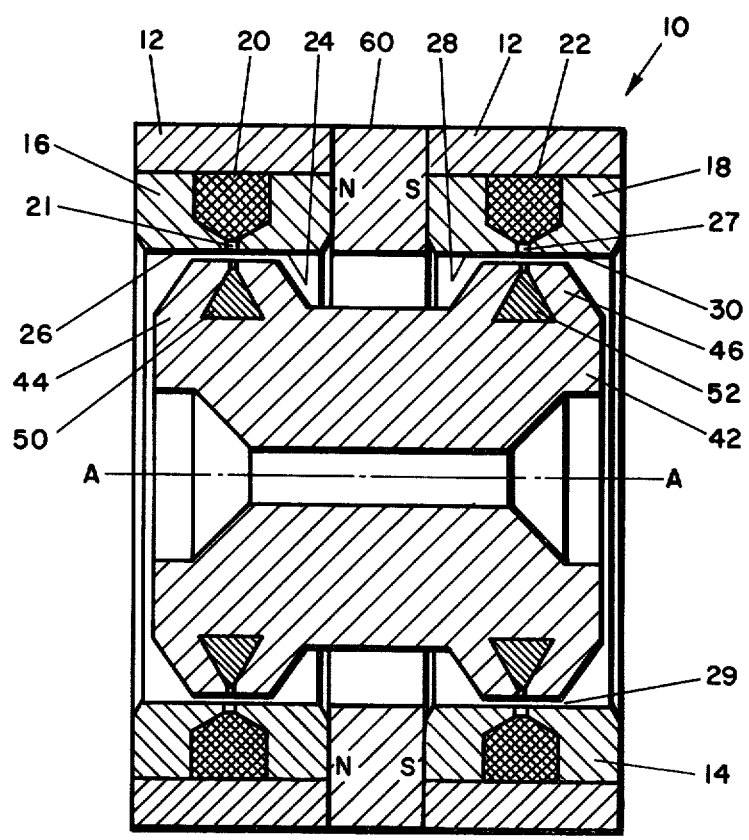

In FIG. 2 there is shown an arrangement of the invention wherein the constant flux for the magnetic circuit is produced by a permanent magnet means 60 instead of by a direct current energized electromagnet means 32 as in the arrangement of FIG. 1. In all other respects the arrangements of both FIG. 1 and FIG. 2 are the same and like reference numerals designate like elements.

The wound stator, axially reciprocating armature type linear reciprocating electrodynamic machines of the present invention operate on the well-known electromagnetic principle that when a current carrying conductor is disposed in a magnetic field a force is exerted on the conductor. This force is proportional to the flux density of the magnetic field, the length of conductor in the field and the current in the conductor. Stated in another way, the force is proportional to the flux density of the magnetic field and the ampere-turns disposed in the field and may be expressed as $F \sim \Phi NI$ where:

F=force
$\Phi$=D-C flux
I=current in the A.C. winding
N=number of turns

In operation, the opposite alternating currents carried in the coils 20 and 22 create an MMF across the slot opening, which generates an axial force and causes the constant flux in the magnetic circuit to shift from one side of the respective stator poles to the other side creating a thrust on the armature poles alternately in opposite directions and the armature 42 moves back and forth within the stator.

Thus, during one portion of the alternating current cycle when armature 42 is in, for example, the extreme left end of its travel as viewed in FIG. 1, the constant flux produced by electromagnet member 32 crosses the air gap 29 from stator pole 16 and through tooth tip 26 thereof into the facing armature pole 44, thence along armature 42 to pole 46 thereof at the other end and returns across air gap 29 from armature pole 46 and through facing tooth tip 28 and stator pole 18. During another portion of the alternating current cycle when armature 42 is at the extreme right end of its travel as viewed in FIG. 1, the constant flux crosses air gap 29 from stator pole 16 and through tooth tip 24 thereof into the facing armature pole 44, thence along armature 42 to pole 46 at the other end thereof and returns through stator pole 18 across air gap 29 from armature pole 46 and through facing tooth tip 30 and stator pole 18.

The motor thus employs the combination of a unidirectional magnetic field and differentially connected, alternating current excited, axially spaced stator coils for producing a thrust in either direction in synchronism with the alternating current supplied to such coils to produce one complete cycle of operation of the armature 42 for each cycle of the alternating current supply. Also, the air gap flux density and direct current ampere turns are the same throughout the alternating current cycle as the armature 42 moves back and forth, since the total air gap area of each armature pole 44 and 46 is made the same as the area of the facing tooth tip.

From the foregoing it may be observed that while the operation of the motor depends upon constant flux and alternating current to create an axial force and to shift the constant flux from one side of the stator poles to the other sides thereof, alternating flux in the armature is not necessary. Moreover, not only is alternating flux not necessary for operation, but it is undesirable since it requires that the machine windings be capable of carrying some of the current from the supply which does no useful work and functions merely to build the undesirable alternating field energy. This unwanted alternating flux has been an objectionable feature in all previous linear reciprocating electrodynamic machines, so far as known.

In accordance with this invention, this unwanted alternating flux in the armature is cancelled by the induced alternating currents in low resistance current paths provided in each of the armature poles 44 and 46. Conveniently these low resistance current paths may be provided by short-circuited coils carried by the armature poles. Thus, in the arrangement shown in FIG. 1, the low resistance current paths are provided by disposing a short-circuited coil 50 in the center of armature pole 44 and a similar short-circuited coil 52 in the center of armature pole 46. Since the compensating coils 50 and 52 are short-circuited, the induced current which flows in them will set up a field in such a direction as to oppose the effect which caused it. It will be understood by those skilled in the art that either single or multiple turn coils may be employed. Also, a plurality of coils may be disposed in each armature pole. Further, when the machine is of cylindrical construction such coils may be formed of solid discs of copper or other low resistance material.

In operation, therefore, short-circuited coils 50 and 52 prevent any alternating flux from going through them, except for that needed to supply the IR drops of such coils. Thus, the alternating current in stator slots 21 and 27 creates an axial force, and causes the steady-state flux to shift from one side of the stator poles to the other sides thereof as the armature moves back and forth, but does not create any appreciable alternating flux across the air gap. Accordingly, the reciprocating electrodynamic machines of the present invention exhibit lower losses and a higher power factor than linear reciprocating electrodynamic machines heretofore known.

Figure 3:
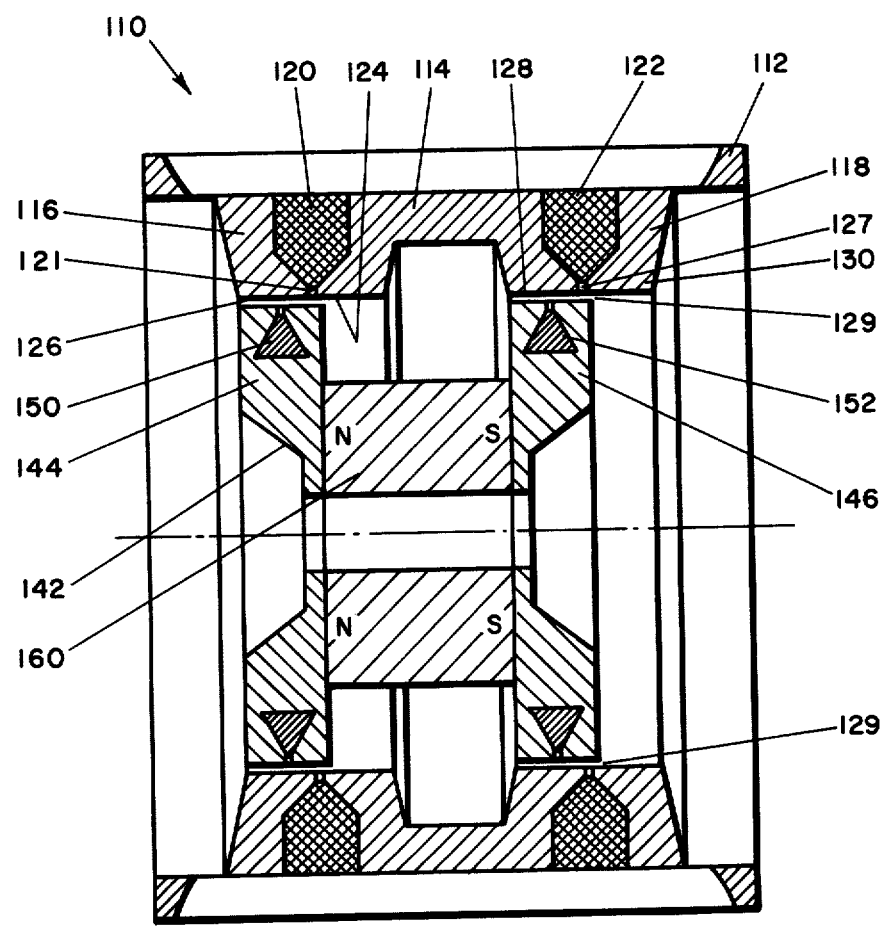

In FIG. 3 there is illustrated the electromagnetic structure of a linear reciprocating electrodynamic machine in accordance with another embodiment of the invention. The arrangement shown in FIG. 3 is essentially the same as that shown in FIG. 1 except that the constant flux is produced by a permanent magnet means carried by the armature rather than by a flux in the armature producing means carried by the stator, as in the embodiments illustrated in FIGS. 1 and 2.

As shown, the motor 110 comprises a magnetic housing 112 within which is disposed the stator core 114. Stator core 114 includes axially spaced-apart poles 116 and 118 carrying the respective wound coils 120 and 122. Poles 116 and 118 are each provided with a slot and overhung tooth tips. Thus, pole 116 is provided with the slot 121 and overhung tooth tips 124 and 126 while pole 118 is provided with the slot 127 and overhung tooth tips 128 and 130 and which tooth tips each have equal air gap areas. Coils 120 and 122 are disposed on the respective stator poles 116 and 118 and are arranged to be energized so as to carry opposite alternating currents in the two slots 121 and 127.

Motor 110 also includes the armature 142 arranged to be supported for movement along the axis A—A of the stator 114. Armature 142 comprises a permanent magnet member 160 and a pair of pole pieces 144 and 146 at the opposite ends thereof. As in the embodiment of FIGS. 1 and 2 the arrangement, spacing and air gap areas of the armature poles 144 and 146 and the stator tooth tips 124–126 and 128–130, respectively, are such that the magnetic circuit has only one clearance gap 119 and air gap flux density and direct current ampere turns which remain constant regardless of the position of the armature 142 along the axis A—A. Thus, the air gap area of armature pole piece 144 is made the same as the area of facing tooth tip 124 (which is the same as the air gap area tooth tip 126) and the air gap area of armature pole piece 146 is made the same as the area of facing tooth tip 128 (which is the same as the air gap of tooth tip 130).

As previously described, unwanted alternating flux is cancelled as in the embodiment of FIGS. 1 and 2 by the induced alternating currents in the low resistance current paths provided in the armature poles. As shown, a short-circuited coil 150 is disposed in the center of armature pole 144 and a similar short-circuited coil 152 is disposed in the center of armature pole 146.

The operation of the motor of FIG. 3 is the same as that already described in detail in connection with the embodiments of FIGS. 1 and 2. The difference in the various embodiments is that in the arrangement of FIG. 1 the constant flux is produced by a direct current excited coil 32 carrier by the stator whereas in the arrangements of FIGS. 2 and 3 the constant flux is produced by a permanent magnet means. In FIG. 2 the permanent means is carried by the stator and in FIG. 3 the permanent magnet means is carried by the armature.

While only certain preferred embodiments of the invention have been shown by way of illustration, many modifications and changes will occur to those skilled in the art. It is therefore to be understood that changes may be made in the particular embodiments of the invention described which are within the full intended scope of the invention as set forth in the appended claims.

What is claimed as new and desired to secure by United States Letters Patent is:

1. An electrodynamic machine comprising: a magnetic circuit having an axially polarized constant flux source and axially spaced wound stator poles with slots and tooth tips which simultaneously confront the axially spaced poles of an axially movable flux conducting armature through an air gap; and means establishing low resistance current paths in each of said armature poles operative to cancel alternating flux in said armature poles.

2. The electrodynamic machine recited in claim 1 wherein said low resistance current paths comprise short-circuited coil means disposed in each of said armature poles.

3. In a linear electrodynamic machine of the type comprising a magnetic circuit having an axially polarized constant flux source, a stator member including axially spaced wound poles each having a slot and tooth tips, and a flux conducting armature member of magnetizable material supported for axial movement within said stator member and having axially spaced poles which simultaneously confront said stator pole teeth through an air gap, the combination with said magnetic circuit of:
   a. means for maintaining the air gap flux density and the direct current ampere turns of said magnetic circuit constant regardless of the position of said armature along the axis of said stator; and
   b. means carried by said armature poles establishing low resistance current paths therein operative to cancel alternating flux in said armature poles.

4. The linear electrodynamic machine recited in claim 3 wherein said means for maintaining constant air gap flux density and direct current ampere turns comprises providing the total air gap area of each armature pole equal to the area of its facing stator pole tooth tip.

5. The linear electrodynamic machine recited in claim 3 wherein said low resistance current paths comprise short-circuited coils carried by the armature poles.

6. The linear electrodynamic machine recited in claim 5 wherein said means for maintaining constant air gap flux density and direct current ampere turns comprises providing the total air gap area of each armature pole equal to the area of its facing stator pole tooth tip.

7. The linear electrodynamic machine recited in claim 3 wherein said constant flux in said magnetic circuit is produced by a direct current energized axially polarized electromagnet carried by said stator member and said opposite alternating currents in said stator slots are produced by coils carried by said stator poles and energizable from an alternating current source.

8. The linear electrodynamic machine recited in claim 3 wherein said constant flux is produced by axially polarized permanent magnet means and said opposite alternating currents in said stator slots are produced by coils carried by said stator poles and energizable from an alternating current source.

9. The linear electrodynamic machine recited in claim 8 wherein said axially polarized permanent magnet means is carried by said stator.

10. The linear electrodynamic machine recited in claim 8 wherein said axially polarized permanent magnet means is carried by said armature.

11. The linear electrodynamic machine recited in claim 4 wherein said constant flux in said magnetic circuit is produced by a direct current energized axially polarized electromagnet carried by said stator member and said opposite alternating currents in said stator slots are produced by coils carried by said stator poles and energizable from an alternating current source.

12. The linear electrodynamic machine recited in claim 4 wherein said constant flux is produced by axially polarized permanent magnet means and said opposite alternating currents in said stator slots are produced by coils carried by said stator poles and energizable from an alternating current source.

13. The linear electrodynamic machine recited in claim 12 wherein said axially polarized permanent magnet means is carried by said stator.

14. The linear electrodynamic machine recited in claim 12 wherein said axially polarized permanent magnet means is carried by said armature.

15. The linear electrodynamic machine recited in claim 5 wherein said constant flux in said magnetic circuit is produced by a direct current energized axially polarized electromagnet carried by said stator member and said opposite alternating currents in said stator slots are produced by coils carried by said stator poles and energizable from an alternating current source.

16. The linear electrodynamic machine recited in claim 5 wherein said constant flux is produced by axially polarized permanent magnet means and said opposite alternating currents in said stator slots are produced by coils carried by said stator poles and energizable from an alternating current source.

17. The linear electrodynamic machine recited in claim 16 wherein said axially polarized permanent magnet means is carried by said stator.

18. The linear electrodynamic machine recited in claim 16 wherein said axially polarized permanent magnet means is carried by said armature.

19. The linear electrodynamic machine recited in claim 6 wherein said constant flux in said magnetic circuit is produced by a direct current energized axially polarized electromagnet carried by said stator member and said opposite alternating currents in said stator slots are produced by coils carried by said stator poles and energizable from an alternating current source.

20. The linear electrodynamic machine recited in claim 6 wherein said constant flux in said magnetic circuit is produced by axially polarized permanent magnet means and said opposite alternating currents in said stator slots are produced by coils carried by said stator poles and energizable from an alternating current source.

21. The linear electrodynamic machine recited in claim 20 wherein said axially polarized permanent magnet means is carried by said stator.

22. The linear electrodynamic machine recited in claim 20 wherein said axially polarized permanent magnet means is carried by said armature.

23. A linear electrodynamic machine comprising:
a. A stator member including axially spaced-apart poles each having a slot and overhung tooth tips;
b. Means for alternately oppositely magnetizing said stator poles;
c. A flux conducting armature member of magnetizable material supported for axial movement within said stator, said armature including a body portion with poles at opposite ends thereof extending toward said stator tooth tips and spaced slightly therefrom to define an air gap therebetween, the centerlines of said armature poles being spaced apart a distance equal to the spacing between the center lines of said stator poles and the air gap area of each armature pole being equal to the air gap area of a stator tooth tip;
d. Means producing an axially polarized constant flux in the magnetic circuit established by said stator and said armature members and wherein said flux crosses said air gap from one stator pole to a facing pole at one end of said armature thence axially through said body portion and returns across said air gap from the pole at the opposite end of said armature and through the other stator pole; and
e. Means carried by said armature poles establishing low resistance current paths therein operative to cancel alternating flux in said armature poles.

24. The linear electrodynamic machine recited in claim 23 wherein said low resistance current paths comprise short-circuited coils disposed in said armature poles.

25. The linear electrodynamic machine recited in claim 23 wherein said means for alternately oppositely magnetizing said stator poles comprises differentially connected coils carried by said stator poles and energizable from an alternating current source.

26. The linear electrodynamic machine recited in claim 25 wherein said low resistance current paths comprise short-circuited coils disposed in said armature poles.

* * * * *